United States Patent [19]
Rehrig et al.

[11] Patent Number: 5,368,318
[45] Date of Patent: Nov. 29, 1994

[54] COLLAPSIBLE CHILD SEAT ASSEMBLY FOR CART

[75] Inventors: Houston Rehrig, 6345 Ridgeway Rd., Richmond, Va. 23226; Matthew Valla, Richmond, Va.

[73] Assignee: Houston Rehrig, Potomac, Md.

[21] Appl. No.: 989,581

[22] Filed: Dec. 11, 1992

[51] Int. Cl.$^5$ .............................................. B62B 11/00
[52] U.S. Cl. ................................. 280/33.993; 16/267; 16/342
[58] Field of Search ...................... 280/33.993, 33.992; 49/386; 16/267, 319, 342

[56] References Cited

U.S. PATENT DOCUMENTS

| | | | |
|---|---|---|---|
| Re. 25,616 | 7/1964 | Stanley | 280/33.99 |
| 208,343 | 9/1878 | Somers | |
| 2,347,908 | 5/1944 | Hoffert | 1/15 |
| 2,347,980 | 5/1944 | Apfelbaum | 220/31 |
| 2,860,885 | 11/1958 | Schweitzer | 280/33.993 |
| 2,998,978 | 9/1961 | Sides | 280/33.99 |
| 3,023,018 | 2/1962 | Welter | 280/33.99 |
| 3,184,248 | 5/1965 | Hummer | 280/33.993 |
| 3,295,714 | 1/1967 | Addario | 220/31 |
| 3,329,441 | 7/1967 | Mills, Jr. | 280/33.99 |
| 3,497,234 | 2/1970 | Schray | 280/33.993 |
| 3,537,212 | 11/1970 | Gilles | 49/381 |
| 3,815,701 | 6/1974 | Mayhew | 180/69 C |
| 3,963,255 | 6/1976 | Trubiano | 280/33.99 B |
| 3,996,084 | 6/1976 | Box | 220/326 |
| 3,999,774 | 12/1976 | Rehrig | 280/33.99 R |
| 4,046,394 | 9/1977 | Thompson, Jr. | 280/33.99 B |
| 4,065,142 | 12/1977 | Rehrig | 280/33.99 B |
| 4,125,270 | 11/1978 | Trubiano | 280/33.99 B |
| 4,176,849 | 12/1979 | Rehrig | 280/33.99 B |
| 4,273,346 | 6/1981 | Rehrig | 280/33.99 F |
| 4,471,970 | 9/1984 | Trubiano | 280/33.993 |
| 4,650,199 | 3/1987 | Rehrig | 280/33.99 S |
| 4,865,338 | 9/1989 | Rehrig | 280/33.992 |
| 4,992,639 | 5/1990 | Rehrig | 40/308 |
| 5,031,270 | 7/1991 | Lee | 16/342 X |
| 5,033,162 | 7/1991 | Jacob et al. | 16/342 X |
| 5,109,573 | 5/1992 | Sherman | 16/342 X |

Primary Examiner—Karin L. Tyson
Assistant Examiner—F. Zeender
Attorney, Agent, or Firm—Banner, Birch, McKie & Beckett

[57] ABSTRACT

A collapsible child seat assembly for a shopping cart has a plastic seat panel and a plastic leg opening cover, both of which are pivotally mounted on a horizontal hinge wire that itself is fixedly mounted on a swingable rear gate of the cart. The forward edge of the seat panel is slidably mounted to a seat back pivotally attached to the rear gate. The rear edges of the seat panel and leg opening cover have interdigitated hinge extensions forming slots that accept therein the horizontal hinge wire for pivotal motion thereon. The hinge wire has protuberances corresponding to the locations of the hinge extensions of the leg opening cover. These protuberances cooperate with cantilevered leaf springs extending into the slots of the hinge extensions of the leg opening cover to frictionally retain the leg opening cover in its upright position covering the leg openings until it is manually folded against the seat panel. When the seat back is folded against the rear gate, the leg opening cover can remain stationary in the covering position. As a result, when the seat back is swung back open for the storage of merchandise in the seating compartment, the leg opening cover is already in its upright position covering the leg openings. This avoids the problem of merchandise falling from the cart as a result of shoppers forgetting to pivot the leg opening cover to the upright position before placing items in the seating compartment.

20 Claims, 6 Drawing Sheets

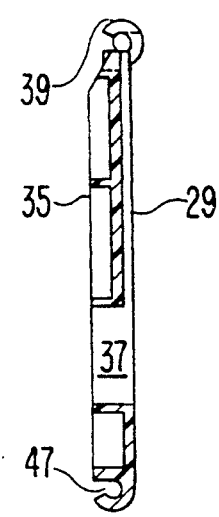
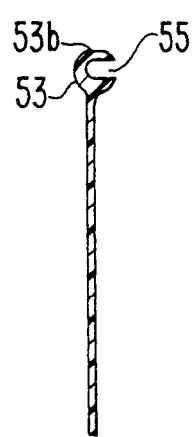
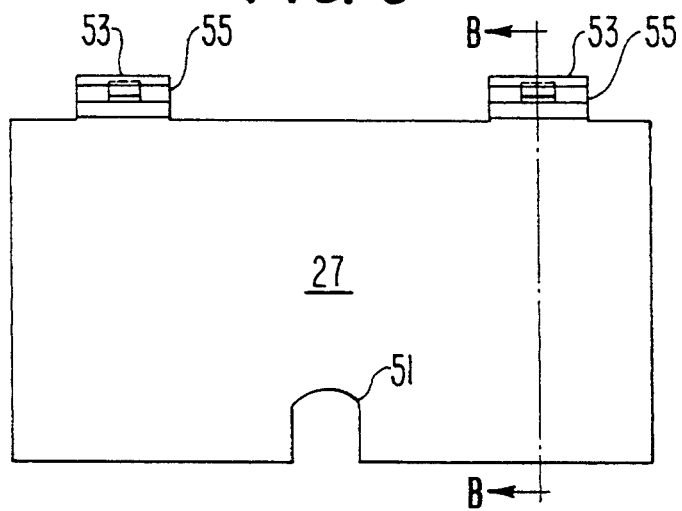
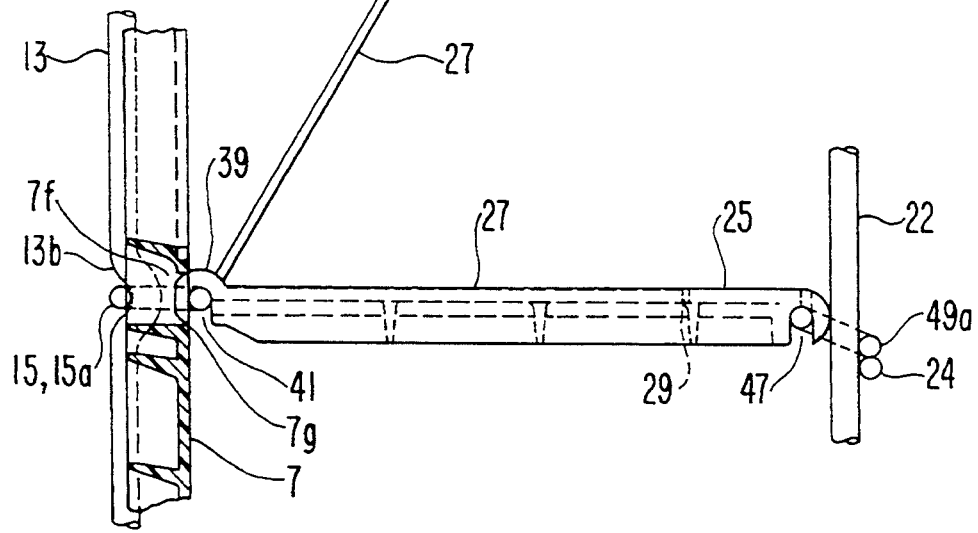

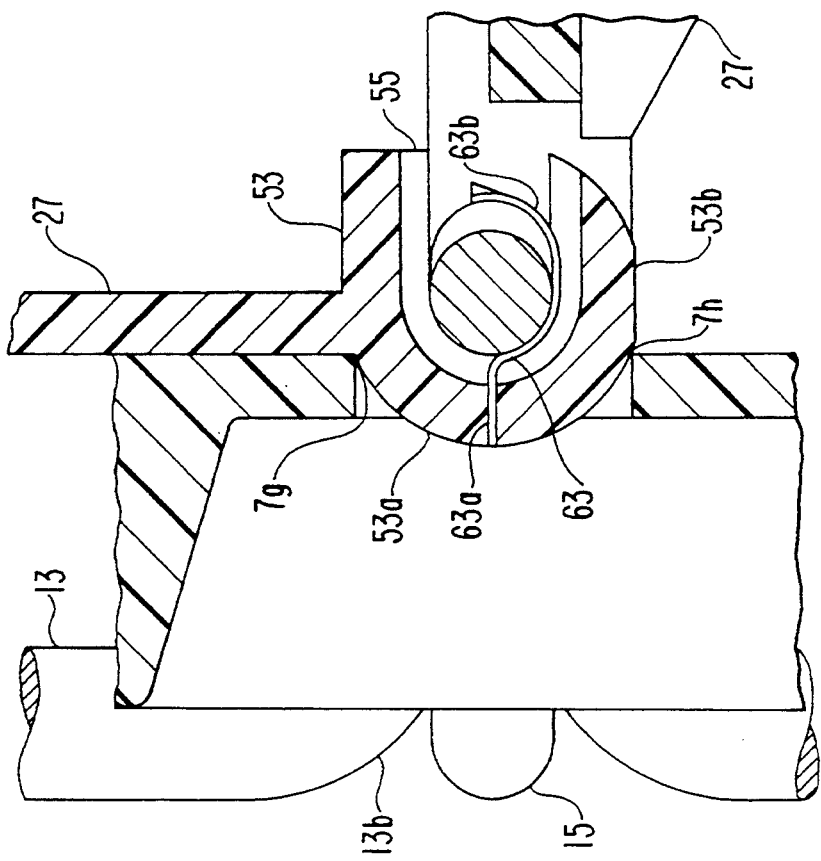
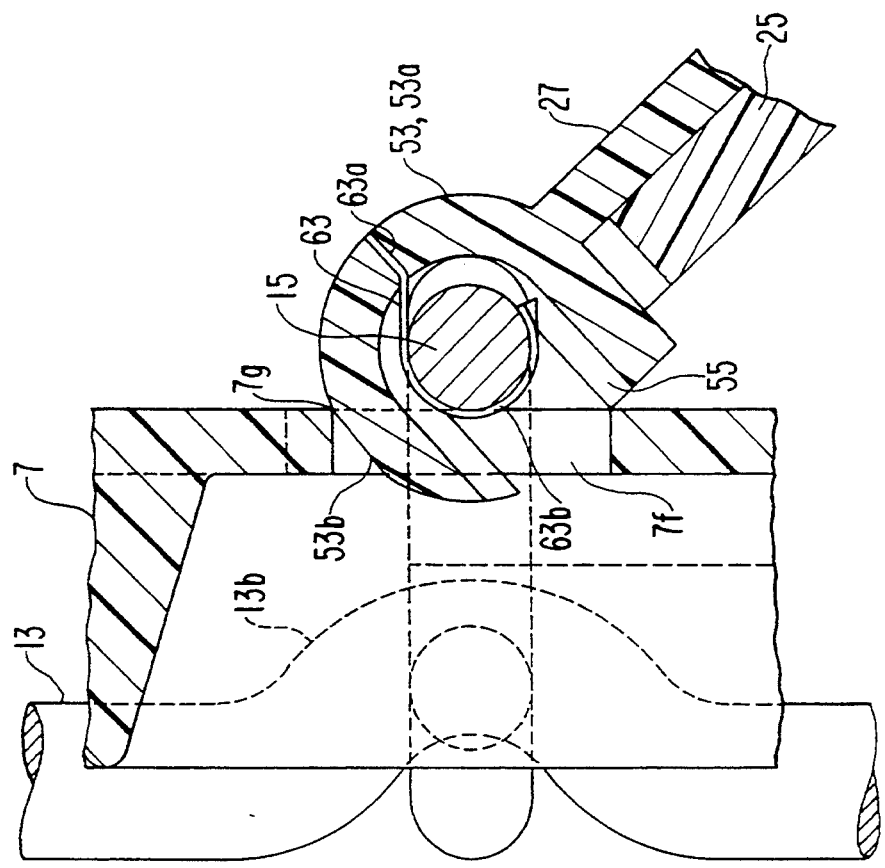

COLLAPSIBLE CHILD SEAT ASSEMBLY FOR CART

BACKGROUND OF THE INVENTION

The present invention relates to shopping carts and the like. More specifically, the invention relates to an improved child seat assembly for such a cart, particularly such a cart employing metal frame components and plastic basket panels.

Wheeled shopping carts comprising metal frame components and generally open latticed plastic basket panels have in great measure replaced their metal wire basket predecessors as the cart type chosen for shoppers' use by retail establishments such as grocery and department stores. Retail establishments and their customers alike generally prefer the former design due to its light weight, low cost, attractiveness, impact resistance, ease of cleaning and maintenance, and elimination of rust and corrosion. Houston Rehrig, one of the present inventors, is largely responsible for bringing about this significant improvement in the industry. Some of his previous inventive cart designs are disclosed in the following U.S. Pat. Nos. 3,999,774; 4,065,142; 4,176,849; 4,273,346; 4,650,199; 4,865,338 and 4,922,639 issued to him.

Of the just mentioned patents, U.S. Pat. Nos. 4,065,142 and 4,176,849 specifically disclose and claim plastic child seats for a cart. These child seats are a significant improvement over prior art child seats employing a metal wire seat frame and a plastic leg opening cover. Therein, a plastic seat panel is hinged about a horizontal wire secured to a seat back. When the seat back is pivoted rearwardly toward the plastic rear gate panel, to collapse the seating compartment, the seat's back edge, which is trapped between slide wires fastened to the rear gate panel, rises allowing the seat back to fold against the rear gate. Hingedly attached to the seat panel is a leg opening cover which, when pivoted to an upright position, covers leg openings provided in the rear gate panel, thereby allowing a user to utilize the seating compartment for storage of small merchandise items. If this leg opening cover is in the upright covering position when the seat back is closed against the rear gate panel, the leg opening cover rises to a position protruding above the top of the cart basket where it is susceptible to damage. Accordingly, in use, the leg opening cover is typically pivoted to a position flat against the seat panel before the seat back is folded against the rear gate panel. As a result, when the seat back is moved forward to open the seating compartment, the leg opening cover remains flat against the seat panel. Even if the leg opening cover is not intentionally pivoted against the seat panel, the leg opening cover can easily inadvertently be caused to fall against the seat panel. This is because no mechanism is provided for positively holding the leg opening cover in the upright covering position.

Often, shoppers will open the seating compartment for the storage of merchandise therein, but fail to ensure that the seat flap is raised against the leg openings before placing merchandise in the seat area. There is thus a danger of items falling from the cart through the uncovered leg openings with the result that fragile items may break upon falling to the floor. This obviously results in wasted product, shopper embarrassment and inconvenience, and personnel disruption for the required clean-up. There is thus a need for a collapsible child seat assembly for a cart which better ensures that a leg opening cover thereof will (1) be in its upright covering position when the seat back is moved forward to open the seating compartment for the storage of merchandise, and (2) remain in that position until it is intentionally lowered.

SUMMARY OF THE INVENTION

In view of the foregoing, it is an overall object of the present invention to provide an improved child seat assembly for a shopping cart or the like.

Specifically, it is a principal object of the present invention to provide a collapsible child seat assembly for a cart that better ensures that a leg opening cover thereof will (1) be in its upright covering position when the seat back is moved forward to open the seating compartment for the storage of merchandise, and (2) remain in that position until it is intentionally lowered.

It is a further object of the present invention to provide a collapsible child seat assembly for a cart arranged such that if the seat back is closed while the leg opening cover is in its upright covering position, the leg opening cover will remain stationary and not rise to a position protruding above the top of the cart basket.

It is still another object of the present invention to provide a collapsible child seat assembly for a cart having reduced material and manufacturing costs.

Yet another object of the present invention is to provide a collapsible child seat assembly for a cart which is easily assembled and has a high degree of structural integrity.

Another object of the present invention is to provide a collapsible child seat assembly for a cart which accomplishes the above objectives and is particularly suited for a cart employing metal wire frame components and plastic basket panels.

The above and other objects are achieved by the present invention which, in a first aspect, provides in a cart having a basket for carrying items, a collapsible child seat assembly configured as follows. An upstanding sidewall of the cart basket has at least one child seat leg opening therein. A movable seat back frame is pivotally attached to the sidewall for movement between an open position wherein the seat back frame extends obliquely away from the sidewall into said basket, and a closed position wherein the seat back frame is collapsed against the sidewall. A plastic seat panel is pivotally attached at its rearward edge to the sidewall and slidably attached at its forward edge to the seat back frame in such a manner that the seat panel assumes a usage position providing a generally horizontal seating surface when the seat back frame is in the open position, and a non-usage position collapsed between the sidewall and seat back frame when the seat back frame is in the closed position. A plastic leg opening cover is pivotally attached at its rearward edge to the sidewall, coaxially with the rearward edge of the seat panel. When the seat back frame is in the open position, the leg opening cover is movable between a non-covering position wherein the leg opening cover lies against the seat panel, and a coveting position wherein the leg opening cover extends along the sidewall and covers the at least one leg opening therein. The leg opening cover can remain stationary in the covering position when the seat back frame is moved from its open position to its closed position, or vice versa.

In another aspect, the invention provides in a cart having a generally open plastic latticework basket for carrying items, a collapsible child seat assembly configured as follows. A swingable rear gate of the basket comprises a plastic rear gate panel secured to (1) a pair of swing wires pivotally supported at their upper ends to a cart frame, and (2) a horizontal hinge wire secured to and extending between the pair of swing wires. The rear gate panel has at least one child seat leg opening therein. A movable seat back frame is pivotally attached to the pair of swing wires for movement between an open position wherein the seat back frame extends obliquely away from the rear gate panel into the basket, and a closed position wherein the seat back frame is collapsed against the rear gate panel. A plastic seat panel is pivotally attached at its rearward edge to the horizontal hinge wire and slidably attached at its forward edge to the seat back frame in such a manner that the seat panel assumes a usage position providing a generally horizontal seating surface when the seat back frame is in the open position, and a non-usage position collapsed between the rear gate panel and seat back frame when the seat back frame is in the closed position. A plastic leg opening cover is pivotally attached at its rearward edge to the horizontal hinge wire coaxially with the rearward edge of the plastic seat panel. When the seat back frame is in the open position the leg opening cover is movable between a non-covering position wherein the leg opening cover lies against the seat panel and a covering position wherein the leg opening cover extends along the rear gate panel and covers the at least one leg opening therein. The leg opening cover can remain stationary in the covering position when the seat back frame is moved from its open position to its closed position, or vice versa.

In yet another aspect, the invention provides a collapsible child seat assembly for use in a cart having a basket for carrying items and a seat back frame pivotally attached to a basket sidewall having at least one leg opening therein. The child seat assembly includes a hinge wire attachable to the cart. A molded seat panel is provided having at least one hinge extension defining a hinge slot along an edge of the seat panel for accommodating therein a first portion of the hinge wire and allowing pivotal motion of the seat panel thereon. A molded leg opening cover is provided having at least one hinge extension defining a hinge slot along an edge of the leg opening cover for accommodating therein a second portion of the hinge wire and allowing pivotal motion of the leg opening cover thereon both together with and separate from the seat panel. A holding mechanism is provided for positively automatically holding the leg opening cover in a covering position on the hinge wire once it is placed therein and until it is manually removed from the covering position. The holding mechanism comprises cooperative elements provided on the hinge wire and within the hinge slot of the leg opening cover, respectively.

Preferably, the cooperative elements comprise a cantilevered leaf spring secured to the leg opening cover and extending into the hinge slot thereof to extend about the second portion of the hinge wire, and a protuberance is provided on the second portion of the hinge wire. The spring is displaced outwardly by the protuberance in a cam-like manner as the leg opening cover is moved into the covering position. The spring thereby frictionally engages the protuberance to hold the leg opening cover in the first position.

The above and other objects and features of the invention will be apparent and fully understood from the following detailed description of the preferred embodiments, taken in connection with the accompanying drawings.

BRIEF DESCRIPTION OF THE DRAWINGS

FIG. 5 is a cross-sectional view taken along line A—A in FIG. 4.

FIG. 6 is a top plan view of a leg opening cover of the inventive assembly.

FIG. 7 is a cross-sectional view taken along line B—B in FIG. 6.

FIG. 8 is a broken-away side view, partially in cross-section, of the inventive assembly, illustrating the pivotal attachment of the seat panel to a hinge wire, and the pivotal movement of the leg opening cover.

FIG. 9 is a close-up broken-away side view, partially in cross-section, illustrating the pivotal attachment of the leg opening cover to the hinge wire, and showing the leg opening cover and seat panel assembly at an angle allowing the mounting thereof onto the hinge wire.

FIG. 10 is a view similar to FIG. 9 showing the leg opening cover in its upright covering position.

DETAILED DESCRIPTION OF THE PREFERRED EMBODIMENTS

Figure 1:
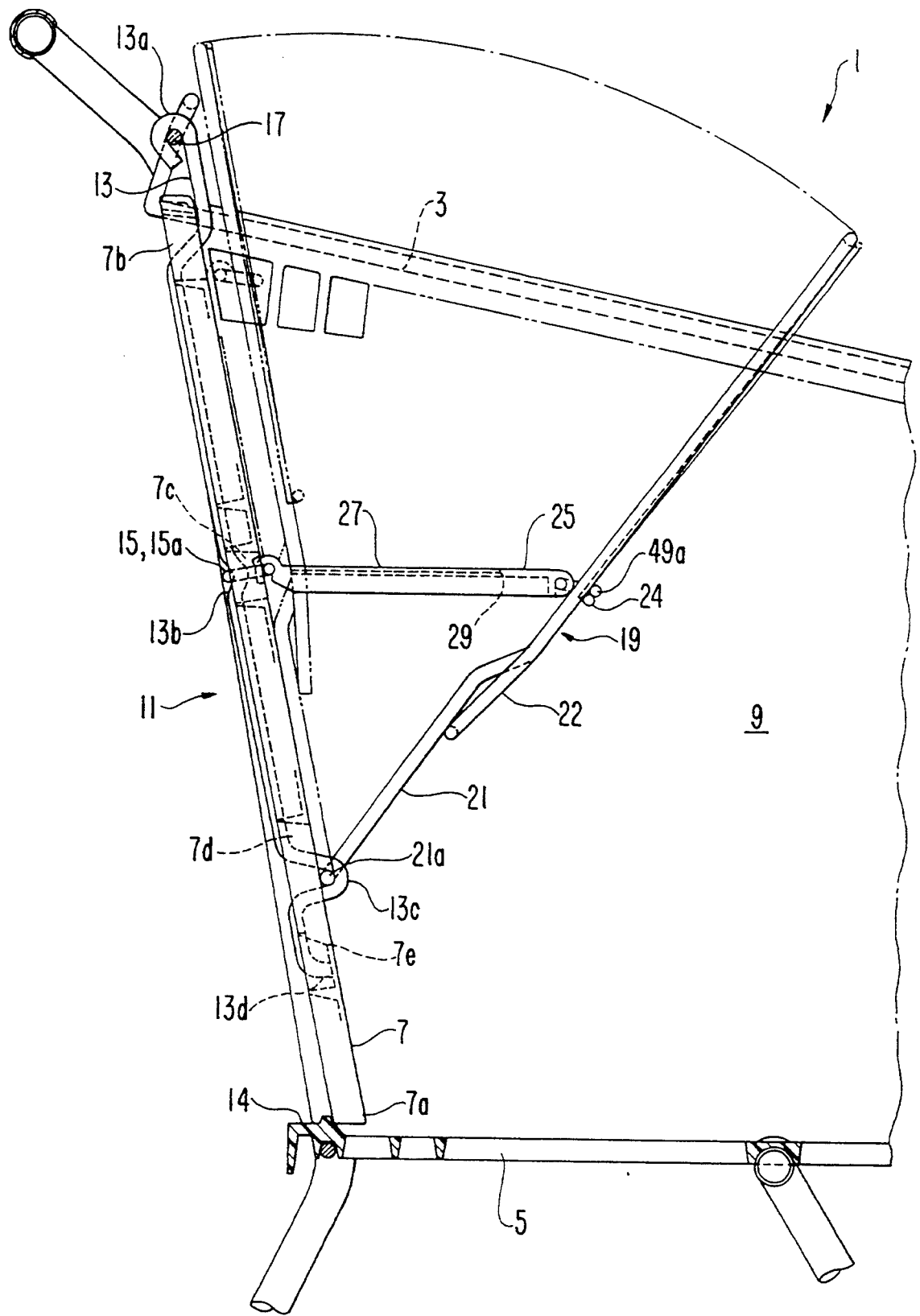
FIG. 1 is a side elevational view, partially in section, of a cart and collapsible child seat assembly in accordance with the present invention.

The collapsible child seat assembly of the present invention is a subassembly of a cart, e.g., a shopping cart or the like, as depicted generally by 1 in FIG. 1. Cart 1 comprises two side panels 3 (only one shown), a bottom panel 5, a front panel (not shown) and a rear gate panel 7. These panels define a basket 9 for storage of merchandise items and the like. The basket defining panels are preferably generally open plastic latticework panels. Except for rear gate panel 7, these panels may be integrally molded and secured in a known manner to a metal frame comprising solid wire and hollow tubular components, e.g., as disclosed in Rehrig U.S. Pat. No. 3,999,774, incorporated herein by reference.

Figure 2:
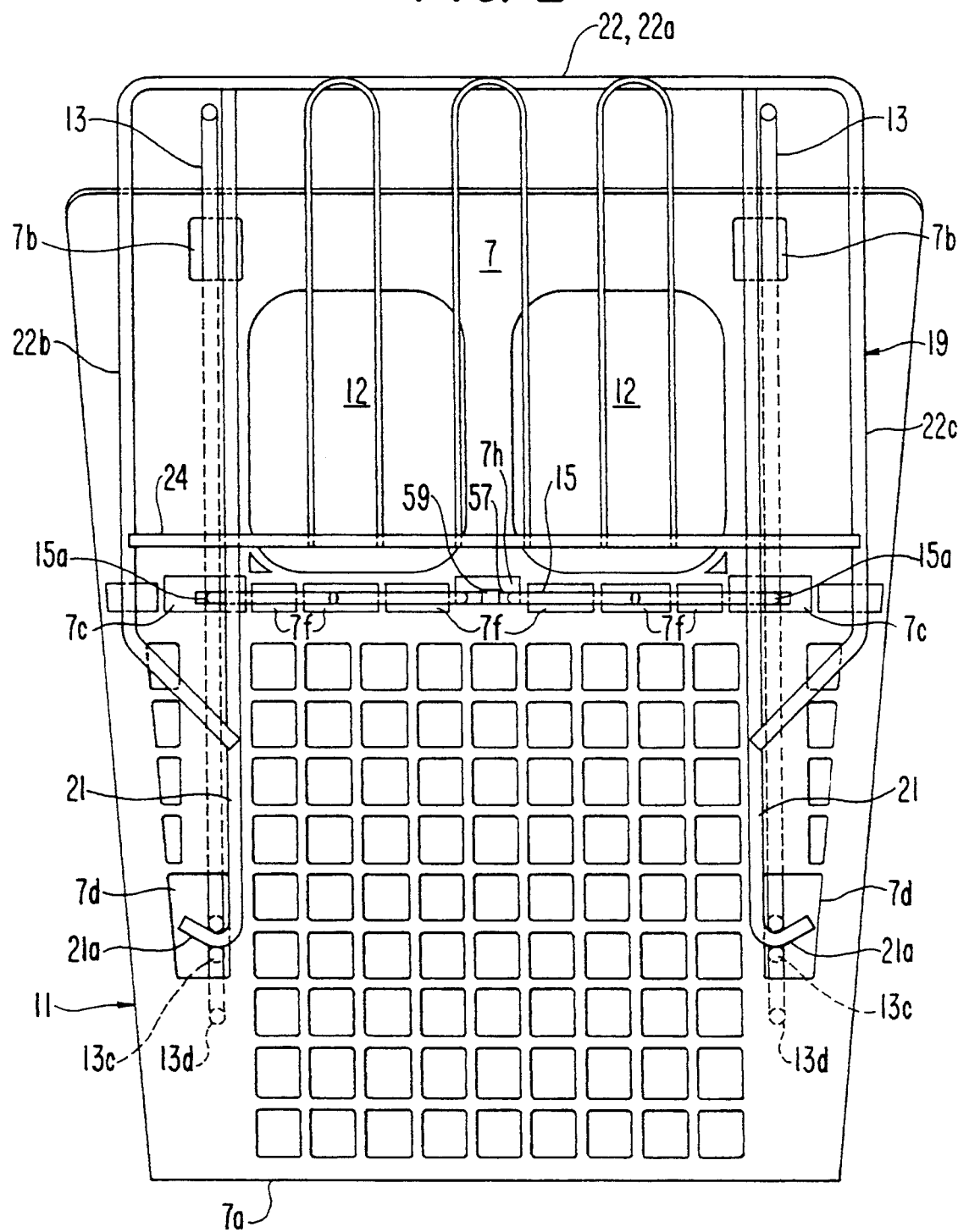
FIG. 2 is a front elevational view of a seat back frame and rear gate of the inventive assembly, assembled and folded together, with the plastic seat panel and leg hole cover assembly omitted for clarity.

As best seen in FIG. 2, rear gate panel 7 is the main wall forming element of a swingable rear gate depicted generally by 11. An upper portion of rear gate panel 7 defines a pair of child seat leg openings 12. Rear gate 11 also comprises a pair of swing wires 13 and a horizontal hinge wire 15 extending between and secured to swing wires 13. Swing wires 13 mount rear gate panel 7 for pivotal movement between a generally vertical position wherein a lower edge 7a thereof abuts against a bottom edge member 14 (see FIG. 1), and a generally horizontal position wherein rear gate panel 7 extends along the top edge of basket 9. In the former position, rear gate panel 7 provides a rear sidewall of basket 9. In the latter position, the rear side of basket 9 is opened to allow nesting of cart 1 with a like cart.

Swing wires 13 have bent end portions 13a encircling a lateral wire 17 (see FIG. 1) of the metal cart frame such that swing wires 13 are pivotally suspended on wire 17 to hang generally vertically under the force of gravity. From respective ends 13a, hinge wires 13 extend downwardly a short distance along an upper inside surface of rear gate panel 7 and then bend outwardly through openings 7b provided in rear gate panel 7 to extend for most of their lengths along the outside surface of rear gate panel 7.

Hinge wire 15 extends laterally across the inside surface of rear gate panel 7 to provide a horizontal seat panel and leg opening cover hinge axis, as will be described in detail hereinafter. Bent end portions 15a of hinge wire 15 snugly encircle respective centrally located U-shaped bends 13b of swing wires 13. Bends 13b protrude slightly into openings 7c provided in rear gate panel 7. In addition to its hinging function, hinge wire 15 serves to brace the mid-portion of rear gate panel 7 against the major portions of hinge wires 13 extending along the outside surface of rear gate panel 7.

A seat back frame 19 of bent and welded wire construction is pivotally mounted to rear gate 11 for movement between an open position wherein the seat back frame extends obliquely away from rear gate 11 into basket 9, and a closed position wherein the seat back frame is collapsed against rear gate panel 7. As best seen in FIG. 2, seat back frame 19 comprises a pair of longitudinal wires 21 extending downwardly from a top segment 22a of a semi-perimetric frame wire 22. Longitudinal wires 21 have bent end portions 21a pivotally attaching seat back frame 19 to corresponding U-shaped bends 13c provided in swing wires 13. Bends 13c protrude slightly into basket 9 through openings 7d provided in rear gate panel 7. Wire end portions 21a mounted in bends 13c serve also to brace the lower end of rear gate panel 7 against swing wires 13.

Seat back 19 further comprises a lateral wire 24 weldably secured at its ends to downwardly extending segments 22b, 22c of semi-perimetric wire 22. Lateral wire 24 serves as a strength reinforcing structural member of seat back frame 19, and additionally serves as a seat panel support wire as will be described hereinbelow.

Advantageously, with the above arrangement of rear gate 7, each of the bends in swing wires 13 may be made in a single forming operation utilizing a four slide automatic wire forming machine. In comparison, three separate die forming operations are necessary to form the rear gate swing wires disclosed in U.S. Pat. No. 4,065,142. Additionally, the length of wire required for swing wires 13 is reduced by four to five inches as compared with this previous design, since swing wires 13 terminate short of the bottom edge of rear gate panel 7, at bent ends 13d extending into rear gate panel recesses 7e, instead of wrapping around the rear gate panel bottom edge.

Figure 3:
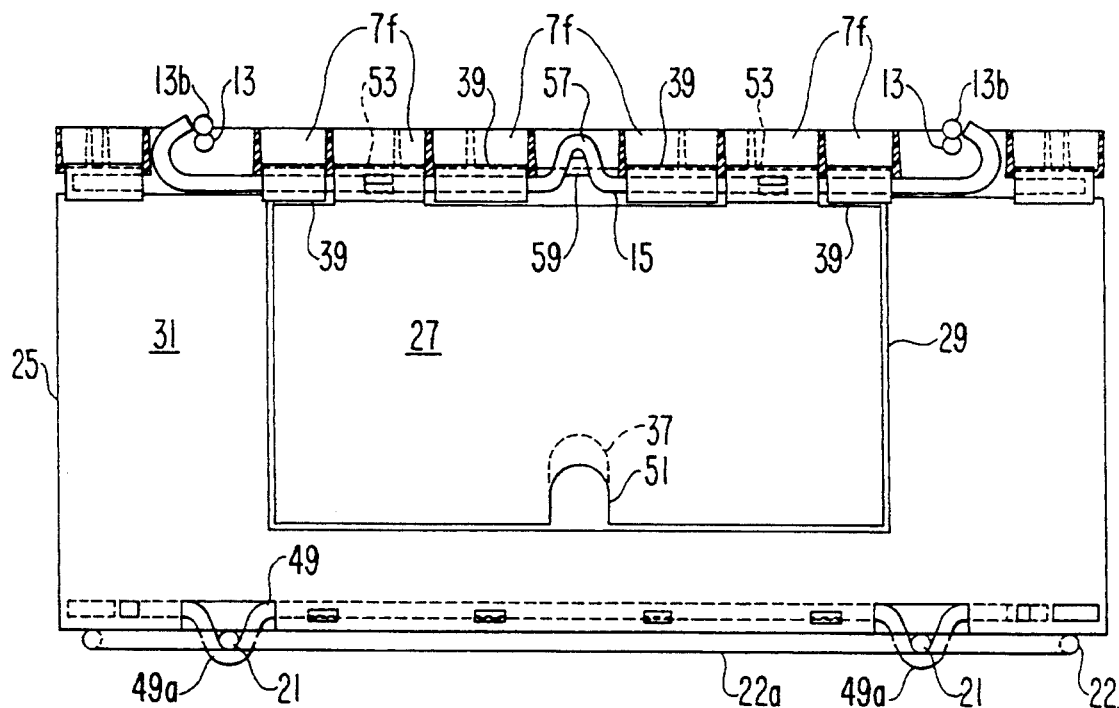
FIG. 3 is a top plan view, partially in section, of the collapsible child seat assembly shown in FIG. 1.

As best seen in FIGS. 1 and 3, a plastic molded seat panel 25 is pivotally attached at its rearward edge to hinge wire 15, and slidably attached at its forward edge to longitudinal wires 21 of seat back frame 19 (above lateral wire 24). Seat panel 25 assumes a usage position providing a generally horizontal seating surface when seat back frame 19 is in its open position (as shown in solid lines in FIG. 1). Seat panel 25 assumes a non-usage position collapsed between rear gate panel 7 and seat back frame 19 when seat back frame 19 is in its closed position (as shown in phantom lines in FIG. 1).

A plastic molded leg opening cover 27 is pivotally attached at its rearward edge to hinge wire 15, coaxially with the rear edge of seat panel 25. When seat back frame 19 is in its open position, leg opening cover 27 is movable between a non-covering position wherein leg opening cover 27 lies flush against seat panel 25 within a recess 29 thereof, and a covering position wherein leg opening cover 27 extends along rear gate panel 7 and covers leg openings 12.

Advantageously, with the above arrangement, leg opening cover 27 can remain stationary in its covering position when seat back frame 19 is moved from its open position to its closed position, or vice versa. In contrast, with the seat designs of U.S. Pat. Nos. 4,065,142 and 4,176,849, when the seat back is moved to its closed position with the leg opening cover in its upright covering position, the leg opening cover is forced to rise with the sliding rear edge of the seat panel to a position protruding above the top of the cart basket. This result of the prior art (avoided by the present invention) leads to the problems described in the Background of the Invention section hereinabove.

Figure 4:
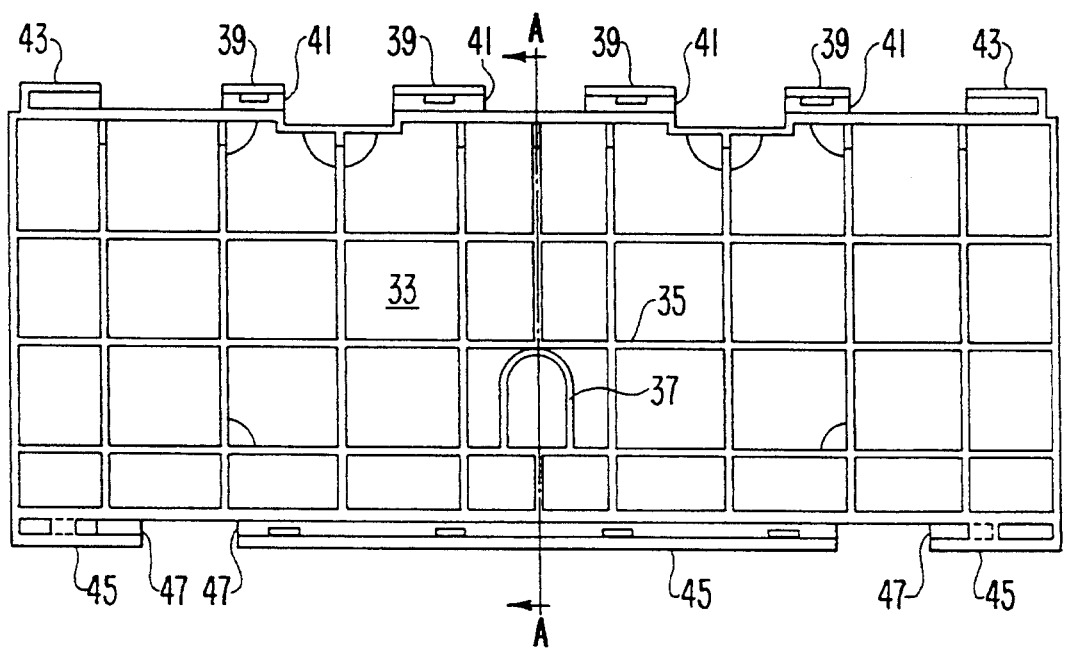
FIG. 4 is a bottom plan view of a seat panel of the inventive assembly.
Figure 11:
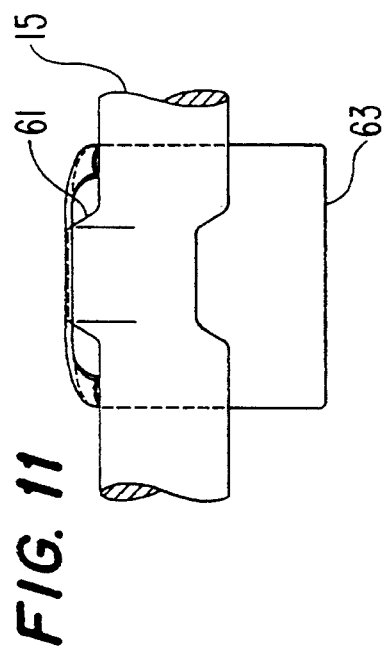
FIG. 11 is a close-up broken-away view of an offset portion of the hinge wire to which the leg opening cover is mounted, and showing also a cantilevered leaf spring of the leg opening cover in its mounted position surrounding the offset portion.

Referring specifically now to FIGS. 3-5, seat panel 25 comprises a single integrally molded plastic member having a smooth seating surface 31, interrupted only by recess 29 which accommodates leg opening cover 27. An undersurface 33 of seat panel 25 is provided with strength reinforcing ribs or latticework 35. Within recess 29 is provided a finger slot 37 for facilitating user movement of leg opening cover 27.

The rearward edge of seat panel 25 can be seen to comprise a plurality of spaced hinge extensions 39. Each hinge extension 39 defines therein a molded hinge slot 41 for receiving a segment of hinge wire 15. A molded extension piece 43 resembling hinge extensions 39 is provided at opposite rearward corners of seat panel 25. Pieces 43 serve to support the ends of seat panel 25 on rear gate panel 7 and cover the ends of hinge wire 15 to thereby create a neater appearance.

The forward edge of seat panel 25 comprises extension pieces 45 defining snap-fit slots 47 for receiving a seat panel edge wire 49. Edge wire 49 has two spaced U-shaped bends 49a protruding from the forward edge of seat panel 25 and wrapping around longitudinal wires 21 for slidably attaching seat panel 25 to seat back 19. U-shaped bends 49a also serve to abut against lateral wire 24 to support seat panel 25 in its generally horizontal usage position.

By slidably attaching seat panel 25 to seat back 19 in the above manner, assembly and material savings are realized over the designs of U.S. Pat. Nos. 4,065,147 and 4,176,849. Since main structural wires of seat back 19 are utilized as slide wires, it is unnecessary to provide a separate slide wire structure. Similarly, since lateral wire 24 doubles as a wire for supporting seat panel 25, no additional structure is necessary for this purpose.

As best seen in FIGS. 3, 6 and 7, leg opening cover 27 likewise preferably comprises a single integrally molded plastic member. The main cover flap portion thereof is flat on both sides and has, in registry with finger slot 37, a corresponding finger slot 51. Finger slot 51 is slightly smaller than finger slot 37 so that a portion of leg opening cover 27 can be easily gripped to separate leg opening cover 27 from seat panel 25.

Molded hinge extensions 53 extend from the rearward edge of leg opening cover 27 and define molded hinge slots 55 for receiving therein corresponding segments of hinge wire 15. As best seen in FIG. 3, when seat panel 25 and leg opening cover 27 are pivotally mounted on hinge wire 15, the hinge extensions 53 of leg opening cover 27 are interdigitated between hinge extensions 39 of seat panel 25.

Seat panel hinge extensions 39 and leg opening cover hinge extensions 53 are similarly configured to cooperate with a series of rear gate panel slots 7f situated along hinge wire 15 to allow hinge extensions 39 and 53 to be inserted over hinge wire 15 during assembly and thereafter be locked within a rotational pattern about hinge wire 15. Specifically, with reference to FIGS. 9 and 10, hinge extension 53 has an outer surface contour comprising a cylindrical side portion 53a and a flat front portion 53b. Slot 7f is sized relative to hinge wire 15 and hinge extension 53 such that hinge extension 53 can be inserted over hinge wire 15 without interference from rear gate panel 7 only when leg opening cover 27 extends downwardly below the horizontal usage position of seat panel 25 (a position illustrated in FIG. 9 and assumed only during assembly of the cart, e.g., before the forward edge of seat panel 25 is slidably attached to seat back 19). In this position, flat front portion 53b is positioned between hinge wire 15 and upper slot edge 7g to provide the necessary clearance for the mounting operation. From FIG. 10 it can be seen that once leg opening cover 27 is pivoted away from the FIG. 9 position, hinge extension 53 is rotationally confined between hinge wire 15 and one or both of upper slot edge 7g and a lower slot edge 7h.

FIG. 8 shows the substantially identical pivotal mounting arrangement of seat panel hinge extensions 39 on hinge wire 15. From this view it is also apparent that in the horizontal usage position of seat panel 25, the lower edges 7h of slots 7f serve as support surfaces for sharing with hinge wire 15 the loads imparted to hinge extensions 39 and 53.

To maintain the integrity of the pivotal arrangements described above, it is necessary to ensure that the entire length of hinge wire 15 remains pressed against rear gate panel 7. To accomplish this, hinge wire 15 is provided with a U-shaped bend 57 at its mid-point. Bend 57 wraps tightly around an upstanding reinforcement tab 59 provided in a central opening 7h of rear gate panel 7 (see FIGS. 2 and 3).

The hinged connections of seat panel 25 and leg opening cover 27 on hinge wire 15 differ in the following respect. A holding mechanism is incorporated into the latter hinged connection for positively automatically holding leg opening cover 27 stationary in its upstanding coveting position once it is placed therein, and until it is manually relieved to return to its non-coveting position against seat panel 25.

Figure 12:
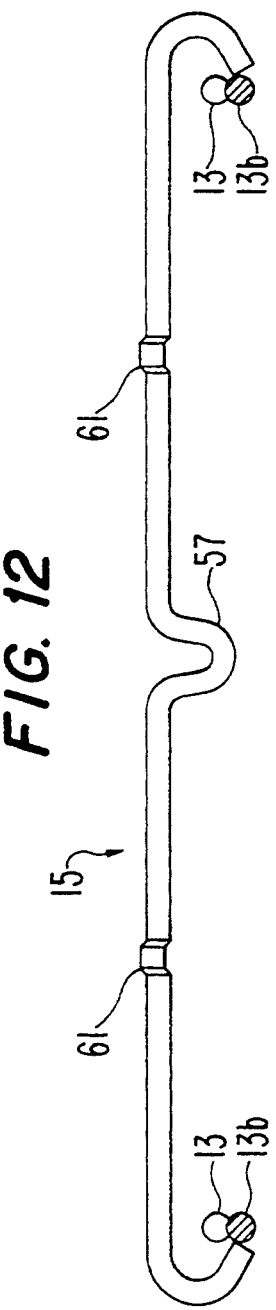
FIG. 12 is a top plan view of the hinge wire showing also, in cross-section, swing wires to which the hinge wire is mounted.
Figure 14:
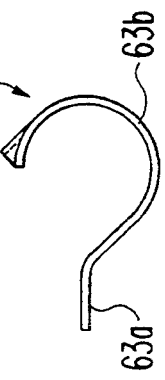
FIG. 14 is a side elevational view of the leaf spring illustrated in FIG. 11.
Figure 13:
FIG. 13 is a front elevational view of the leaf spring illustrated in FIG. 11.

Referring first to FIG. 12, hinge wire 15 has two spaced offsets or protuberances 61, preferably die formed thereon using a four slide automatic wire forming machine. Referring now to FIGS. 9 and 10, it will be seen that protuberances 61 are located on segments of hinge wire 15 received within hinge slots 55 of hinge extensions 53. Protuberances 61 cooperate with cantilevered leaf springs 63 extending into slots 55 to frictionally retain leg opening cover 27 in its upright coveting position. More specifically, each leaf spring 63 has a generally flat portion 63a and a semi-cylindrical portion 63b extending therefrom. Flat portion 63a is friction fit into a thin flat slot provided in the wall of hinge extension 53. Semi-cylindrical portion 63b extends into hinge slot 55 and partially surrounds hinge wire 15 at the point of protuberance 61. Semi-cylindrical portion 63 is sized to have a diameter just slightly larger than hinge wire 15 and to cover slightly more than half of the circumference of hinge wire 15.

So configured, leaf springs 63 will permit leg opening cover 27 to rotate relatively freely through most of its arc. However, as is evident from FIG. 10, as leg opening cover 27 approaches its upstanding covering position, leaf springs 63 will be stressed outwardly and begin to frictionally grip hinge wire 15. The result is that leg opening cover 27 is frictionally retained in its covering position once it is placed therein and until it has been manually relieved to return to its non-covering position against seat panel 25.

To assemble the seat assembly components to cart 1, swing wires 13 are inserted through rear gate panel openings 7b and extended down the outside of rear gate panel 7 so that U-shaped bends 13b and 13c protrude into gate panel openings 7c and 7d, respectively. Next, hinge wire 15 is placed across the inside of gate panel 7 along panel slots 7e. Its ends 15a are then secured to swing wire U-shaped bends 13b to sandwich rear gate panel 7 between swing wires 13 and hinge wire 15. Next, seat back longitudinal wire ends 21a are positioned adjacent to swing wire U-bends 13c, urged inwardly, then allowed to spring into U-bends 13c for pivotally securing seat back 19 to rear gate 11.

Seat panel 25, with leg opening cover 27 residing thereon (in recess 29) is then positioned as shown in FIG. 9 to allow hinge extensions 39 and 53 to be mounted on hinge wire 15. At this point, it is necessary to elastically deform cylindrical portions 63b of springs 63 so as to enable the segments of swing wire 15 having protuberances 61 thereon to pass freely into leg opening cover slots 55 and be partially surrounded by spring cylindrical portions 63b. Next, seat panel 27 is pivoted to its generally horizontal usage position, e.g., as shown in FIG. 8. Edge wire 49 is positioned so that the U-shaped bends 49a thereof are wrapped around longitudinal wires 21 of seat back 19. Wire 49 is then snapped into place in hinge slots 47 to complete the assembly.

The present invention has been described in terms of presently preferred embodiments thereof. Other embodiments within the scope and spirit of the present invention as defined in the appended claims will occur to those having ordinary skill in the art upon reading this disclosure.

We claim:

1. In a cart having a basket for carrying items, a collapsible child seat assembly comprising:
   an upstanding sidewall of said basket having at least one child seat leg opening therein;
   a movable seat back frame pivotally attached to said sidewall for movement between an open position wherein the seat back frame extends obliquely away from said sidewall into said basket, and a closed position wherein the seat back frame is collapsed against said sidewall;

a plastic seat panel pivotally attached at a rearward edge thereof to said sidewall and slideably attached at a front edge thereof to said seat back frame in such a manner that said seat panel assumes a usage position providing a generally horizontal seating surface when said seat back frame is in said open position, and a non-usage position collapsed between said sidewall and seat back frame when said seat back frame is in said closed position; and a plastic leg opening cover pivotally attached at a rearward edge thereof to said sidewall coaxially with said rearward edge of said seat panel;

wherein:

when said seat back frame is in said open position, said leg opening cover is movable between a non-covering position wherein said leg opening cover lies against said seat panel, and a covering position wherein said leg opening cover extends along said sidewall and covers said at least one leg opening therein;

said leg opening cover can remain stationary in said covering position when said seat back frame is moved between its open and closed positions;

said seat assembly further comprises a holding mechanism for positively automatically holding said leg opening cover stationary in said covering position once it is placed therein and until it is manually relieved to return to said non-covering position, said holding mechanism permitting the leg opening cover to pivot relatively freely through most of a pivot arc between said covering and non-covering positions;

said seat panel and leg opening cover each comprise a molded hinge slot provided along a respective one of said rearward edges thereof, said sidewall comprises a horizontal hinge wire received within said molded hinge slots, and said holding mechanism comprises cooperative elements provided on said horizontal hinge wire and within said molded hinge slot of the leg opening cover, respectively;

said cooperative elements comprise a cantilevered leaf spring secured to the leg opening cover, and extending into the molded hinge slot thereof and about a segment of said hinge wire positioned within said molded hinge slot, and a protuberance provided on said segment of hinge wire; and said spring is displaced outwardly by said protuberance in a cam-like manner as said leg opening cover is moved into said covering position, and said spring thereby frictionally engages said protuberance to hold the leg opening cover in said covering position.

2. A collapsible child seat assembly according to claim 1, wherein said seat panel and leg opening cover each comprise a plurality of spaced molded hinge extensions, each defining a said molded hinge slot, said hinge extensions of the leg opening cover being interdigitated between hinge extensions of the seat panel along said horizontal hinge wire.

3. A collapsible child seat assembly according to claim 1, wherein said leg opening cover comprises at least two molded hinge extensions, each defining a said molded hinge slot, and a separate set of said cooperative elements is provided with respect to each molded hinge slot.

4. In a cart having a generally open plastic lattice work basket for carrying items, a collapsible child seat assembly comprising:

a swingable rear gate of said basket comprising a plastic rear gate panel secured to (1) a pair of swing wires pivotally supported at their upper ends to a cart frame and (2) a horizontal hinge wire secured to and extending between said pair of swing wires, said rear gate panel having at least one child seat leg opening therein;

a movable seat back frame pivotally attached to said pair of swing wires for movement between an open position wherein the seat back frame extends obliquely away from said rear gate panel into said basket, and a closed position wherein the seat back frame is collapsed against said rear gate panel;

a plastic seat panel pivotally attached at a rearward edge thereof to said horizontal hinge wire and slidably attached at a forward edge thereof to said seat back frame in such a manner that said seat panel assumes a usage position providing a generally horizontal seating surface when said seat back frame is in said open position, and a non-usage position collapsed between said rear gate panel and seat back frame when said seat back frame is in said closed position; and a plastic leg opening cover pivotally attached at a rearward edge thereof to said horizontal hinge wire coaxially with said rearward edge of said seat panel;

wherein:

when said seat back frame is in said open position, said leg opening cover is movable between a non-covering position wherein said leg opening cover lies against said seat panel, and a covering position wherein said leg opening cover extends along said rear gate panel and covers said at least one leg opening therein;

said leg opening cover can remain stationary in said covering position when said seat back frame is moved between its open and closed positions; and said seat assembly further comprises a holding mechanism for positively automatically holding said leg opening cover stationary in said covering position once it is placed therein and until it is manually relieved to return to said non-covering position, said holding mechanism permitting the leg opening cover to pivot relatively freely through most of a pivot arc between said covering and non-covering positions;

said plastic seat panel and plastic leg opening cover each comprise a molded hinge slot provided along a respective one of said rearward edges thereof, said horizontal hinge wire being received within said molded hinge slots, and said holding mechanism comprises cooperative elements provided on said horizontal hinge wire and within said molded hinge slot of the plastic leg opening cover, respectively;

said cooperative elements comprise a cantilevered leaf spring secured to the plastic leg opening cover, and extending into the molded hinge slot thereof and about a segment of said hinge wire positioned within said molded hinge slot, and a protuberance provided on said segment of hinge wire; and said spring is displaced outwardly by said protuberance in a cam-like manner as said leg opening cover is moved into said covering position, and said spring thereby frictionally engages said protuberance to hold the leg opening cover in said covering position.

5. A collapsible child seat assembly according to claim 4, wherein said seat panel and said leg opening cover each comprise at least one molded hinge extension defining a molded hinge slot.

6. A collapsible child seat assembly according to claim 5, wherein said seat panel and leg opening cover each comprise a plurality of said hinge extensions, the hinge extensions of the leg opening cover being interdigitated between hinge extensions of the seat panel along said horizontal hinge wire.

7. A collapsible child seat assembly according to claim 4, wherein said leg opening cover comprises at least two molded hinge extensions, each defining a said molded hinge slot, and a separate set of said cooperative elements is provided with respect to each molded hinge slot.

8. A collapsible child seat assembly according to claim 5, wherein respective surface contours of said rear gate panel and said hinge extensions are configured so as to prevent removal of said hinge wire from within said hinge slots when said plastic seat panel is in said usage position, said non-usage position, or any position therebetween.

9. A collapsible child seat assembly according to claim 8, wherein a major portion of said horizontal hinge wire extends across an inner surface of said rear gate panel along a series of panel slots provided in said rear gate panel and corresponding in location to said hinge extensions, and said hinge extensions are locked within a rotational pattern about said horizontal hinge wire and partially within said panel slots by respective edge surfaces of said panel slots slidably engaging cylindrical outer surface contours of said hinge extensions.

10. A collapsible child seat assembly according to claim 9, wherein said hinge extensions have respective flat outer surface portions which allow said hinge wire to be moved into and out of said hinge slots only when said seat panel is angled downwardly below said usage position.

11. A collapsible child seat assembly according to claim 4, wherein said seat back frame comprises a lateral seat support wire for supporting said seat in said usage position, and a pair of longitudinally extending slide wires to which said forward edge of the seat panel is slidably attached.

12. A collapsible child seat assembly according to claim 11, wherein said forward edge of the seat panel has a molded slot extending therealong and a seat panel edge wire received therein, said edge wire having two U-shaped bends intermediate its ends that protrude from said forward edge for receiving therein said slide wires and abutting with said transverse seat support wire when said seat panel reaches said usage position.

13. A collapsible child seat assembly according to claim 12, wherein said slide wires have bent end portions which are pivotally engaged with U-shaped bends provided in said swing wires intermediate the ends thereof, said U-shaped bends of the swing wires protruding into said basket through corresponding openings provided in said rear gate panel.

14. A collapsible child seat assembly according to claim 9, wherein a U-shaped bend provided in a midportion of the hinge wire protrudes into said rear gate panel and around a reinforcement tab provided thereon for maintaining said wire mid-portion in its proper position against said rear gate panel.

15. A collapsible child seat assembly for use in a cart having a basket for carrying items and a seat back frame pivotally attached to a basket sidewall having at least one leg opening therein, comprising:
   a hinge wire attachable to said cart;
   a molded seat panel having at least one hinge extension defining a hinge slot along an edge of said seat panel for accommodating therein a first portion of said hinge wire and allowing pivotal motion of said seat panel thereon;
   a molded leg opening cover having at least one hinge extension defining a hinge slot along an edge of said leg opening cover for accommodating therein a second portion of said hinge wire and allowing pivotal motion of said leg opening cover thereon both together with and separate from said seat panel;
   a holding mechanism for positively automatically holding said leg opening cover in a covering position on said hinge wire once it is placed therein and until it is manually removed from said covering position, said holding mechanism comprising cooperative elements provided on said hinge wire and within said hinge slot of the leg opening cover, respectively, said holding mechanism being arranged to permit said leg opening cover to pivot relatively freely through most of a pivot arc between said covering position and a non-covering position wherein said leg opening cover lies flat against said seat panel;
   wherein:
   said cooperative elements comprise a cantilevered leaf spring secured to the leg opening cover, and extending into the hinge slot thereof to extend about said second portion of said hinge wire, and a protuberance provided on said second portion of said hinge wire; and
   said spring is displaced outwardly by said protuberance in a cam-like manner as said leg opening cover is moved into said covering position, and said spring thereby frictionally engages said protuberance to hold the leg opening cover in said covering position.

16. A collapsible child seat assembly according to claim 15, wherein each of said seat panel and leg opening cover are formed of molded plastic and said hinge wire is a metal hinge wire.

17. A collapsible child seat assembly according to claim 15, wherein each of said seat panel and leg opening cover are formed of molded plastic and said hinge wire is a metal hinge wire.

18. In a cart having a generally open plastic lattice work basket for carrying items, a collapsible child seat assembly comprising:
   a swingable rear gate of said basket comprising a plastic rear gate panel secured to (1) a pair of swing wires pivotally supported at their upper ends to a cart frame and (2) a horizontal hinge wire secured to and extending between said pair of swing wires, said rear gate panel having at least one child seat leg opening therein;
   a movable seat back frame pivotally attached to said pair of swing wires for movement between an open position wherein the seat back frame extends obliquely away from said rear gate panel into said basket, and a closed position wherein the seat back frame is collapsed against said rear gate panel;

a plastic seat panel pivotally attached at a rearward edge thereof to said horizontal hinge wire and slidably attached at a forward edge thereof to said seat back frame in such a manner that said seat panel assumes a usage position providing a generally horizontal seating surface when said seat back frame is in said open position, and a non-usage position collapsed between said rear gate panel and seat back frame when said seat back frame is in said closed position; and a plastic leg opening cover pivotally attached at a rearward edge thereof to said horizontal hinge wire coaxially with said rearward edge of said seat panel;

wherein:

when said seat back frame is in said open position, said leg opening cover is movable between a non-covering position wherein said leg opening cover lies against said seat panel, and a covering position wherein said leg opening cover extends along said rear gate panel and covers said at least one leg opening therein;

said leg opening cover can remain stationary in said covering position when said seat back frame is moved between its open and closed positions;

said seat panel and said leg opening cover each comprise a molded hinge extension defining a molded hinge slot;

respective surface contours of said rear gate panel and said hinge extensions are configured so as to prevent removal of said hinge wire from within said hinge slots when said plastic seat panel is in said usage position, said non-usage position, and any position therebetween; and a major portion of said horizontal hinge wire extends across an inner surface of said rear gate panel along a series a panel slots provided in said rear gate panel and corresponding in location to said hinge extensions, said hinge extensions are locked within a rotational pattern about said horizontal hinge wire and partially within said panel slots by respective edge surfaces of said panel slots slidably engaging cylindrical outer surfaces contours of said hinge extensions.

19. A collapsible child seat assembly according to claim 18, wherein said hinge extensions have respective flat outer surface portions which allow said hinge wire to be moved into and out of said hinge slots only when said seat panel is angled downwardly below said usage position.

20. A collapsible child seat assembly according to claim 18, wherein a U-shaped bend provided in a mid-portion of the hinge wire protrudes into said rear gate panel and around a reinforcement tab provided thereon for maintaining said wire mid-portion in its proper position against said rear gate panel.

* * * * *